(12) United States Patent
Tandon et al.

(10) Patent No.: US 11,687,580 B2
(45) Date of Patent: Jun. 27, 2023

(54) AUTO-ADJUSTING DISPLAY TIME OF SLIDES BASED ON CONTENT INTELLIGENCE

(71) Applicant: Microsoft Technology Licensing, LLC, Redmond, WA (US)

(72) Inventors: Sagar Tandon, Ghaziabad (IN); Rotish Kumar, Barnala (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/508,559

(22) Filed: Oct. 22, 2021

(65) Prior Publication Data
US 2022/0414139 A1   Dec. 29, 2022

(30) Foreign Application Priority Data
Jun. 25, 2021   (IN) .............................. 202141028668

(51) Int. Cl.
*G06F 16/40*  (2019.01)
*G06F 16/438*  (2019.01)
(Continued)

(52) U.S. Cl.
CPC ........ *G06F 16/4393* (2019.01); *G06F 16/436* (2019.01); *G06F 16/489* (2019.01); *G06F 18/214* (2023.01)

(58) Field of Classification Search
CPC ... G06F 16/4393; G06F 16/436; G06F 16/489
See application file for complete search history.

(56) References Cited

U.S. PATENT DOCUMENTS 5,574,798 A    11/1996  Greer et al.
10,025,861 B2 *  7/2018  Yi ....................... G06F 16/9535
(Continued)

FOREIGN PATENT DOCUMENTS

CA    2865302 A1 *  8/2013

OTHER PUBLICATIONS

"Deep Learning Rest API, Server & Platform", Retrieved from: https://web.archive.org/web/20210409082730/https://www.deepdetect.com/, Apr. 9, 2021, 3 Pages.
(Continued)

*Primary Examiner* — Kristopher Andersen
(74) *Attorney, Agent, or Firm* — Schwegman Lundberg & Woessner, P.A.

(57) ABSTRACT

Systems and methods are directed to auto-adjusting play time of slides based on content intelligence. The system accesses media comprising a plurality of media items, wherein a media item of the plurality of media items comprises a first content type. The system performs machine analysis associated with the first content type. Based on the machine analysis, the system determines a first display time for the first content type and derives a total display time for the media item based on the first display time. If the media item includes a second content type, then the system performs machine analysis associated with the second content type and determines a second display time for the second content type. The total display time now comprises an aggregation of the first and second display times. The system can cause a machine action based on the total display time.

19 Claims, 6 Drawing Sheets

(51) Int. Cl.
*G06F 16/48* (2019.01)
*G06F 16/435* (2019.01)
*G06F 18/214* (2023.01)

(56) References Cited

U.S. PATENT DOCUMENTS

| | | | |
|---|---|---|---|
| 2004/0012576 A1* | 1/2004 | Cazier | G06T 11/00 345/204 |
| 2006/0192784 A1 | 8/2006 | Yamaji et al. | |
| 2013/0021369 A1* | 1/2013 | Denney | H04N 21/4126 345/620 |
| 2014/0215341 A1* | 7/2014 | Fratti | G06F 16/4393 715/730 |
| 2018/0173959 A1* | 6/2018 | Shah | H04N 5/23222 |
| 2020/0183552 A1* | 6/2020 | Balasubramanian | G06F 3/14 |

OTHER PUBLICATIONS

"ILGnet", Retrieved from: https://github.com/BestiVictory/ILGnet, May 6, 2018, 4 Pages.

"OpenFace", Retrieved from: https://web.archive.org/web/20210323234308/https://cmusatyalab.github.io/openface/, Mar. 23, 2021, 5 Pages.

"Video: Edit Slide Timings—PowerPoint", Retrieved from: https://support.microsoft.com/en-us/office/video-edit-slide-timings-a230df24-32c4-4ed2-aa72-f6e938e58935, Retrieved Date: Dec. 29, 2020, 3 Pages.

"PySceneDetect", Retrieved from: https://pyscenedetect.readthedocs.io/en/latest/, Oct. 11, 2021, 2 Pages.

"International Search Report and Written Opinion Issued in PCT Application No. PCT/US22/029525", dated Aug. 12, 2022, 13 Pages.

* cited by examiner

AUTO-ADJUSTING DISPLAY TIME OF SLIDES BASED ON CONTENT INTELLIGENCE

CLAIM OF PRIORITY

The present patent application claims the priority benefit of the filing date of Indian Application No. 202141028668 filed Jun. 25, 2021, the entire content of which is incorporated herein by reference.

TECHNICAL FIELD

The subject matter disclosed herein generally relates to document presentations. Specifically, the present disclosure addresses systems and methods that automatically adjusts display time of slides based on content intelligence.

BACKGROUND

The creation and use of slideshows is quite common nowadays. Whether through a presentation application (e.g., PowerPoint), video editor application, or any media organizer application, slideshows are the most used medium for presentations. While creating an automatic slideshow or exporting a video out of a presentation application, there is considerable manual effort required to decide an optimal duration for each slide in the video/slideshow based on the content of slides. Generally, default duration is used for each slide (e.g., 5 seconds) and this duration, most of the times, misaligns with the content in the slides. For example, this duration will not be sufficient for a slide with more content (which may take more time to read/understand) and, vice versa, this duration will be too long for a slide with very little content (e.g., title or thank you note).

BRIEF DESCRIPTION OF THE DRAWINGS

Some embodiments are illustrated by way of example and not limitation in the figures of the accompanying drawings.

DETAILED DESCRIPTION

Figure 1:
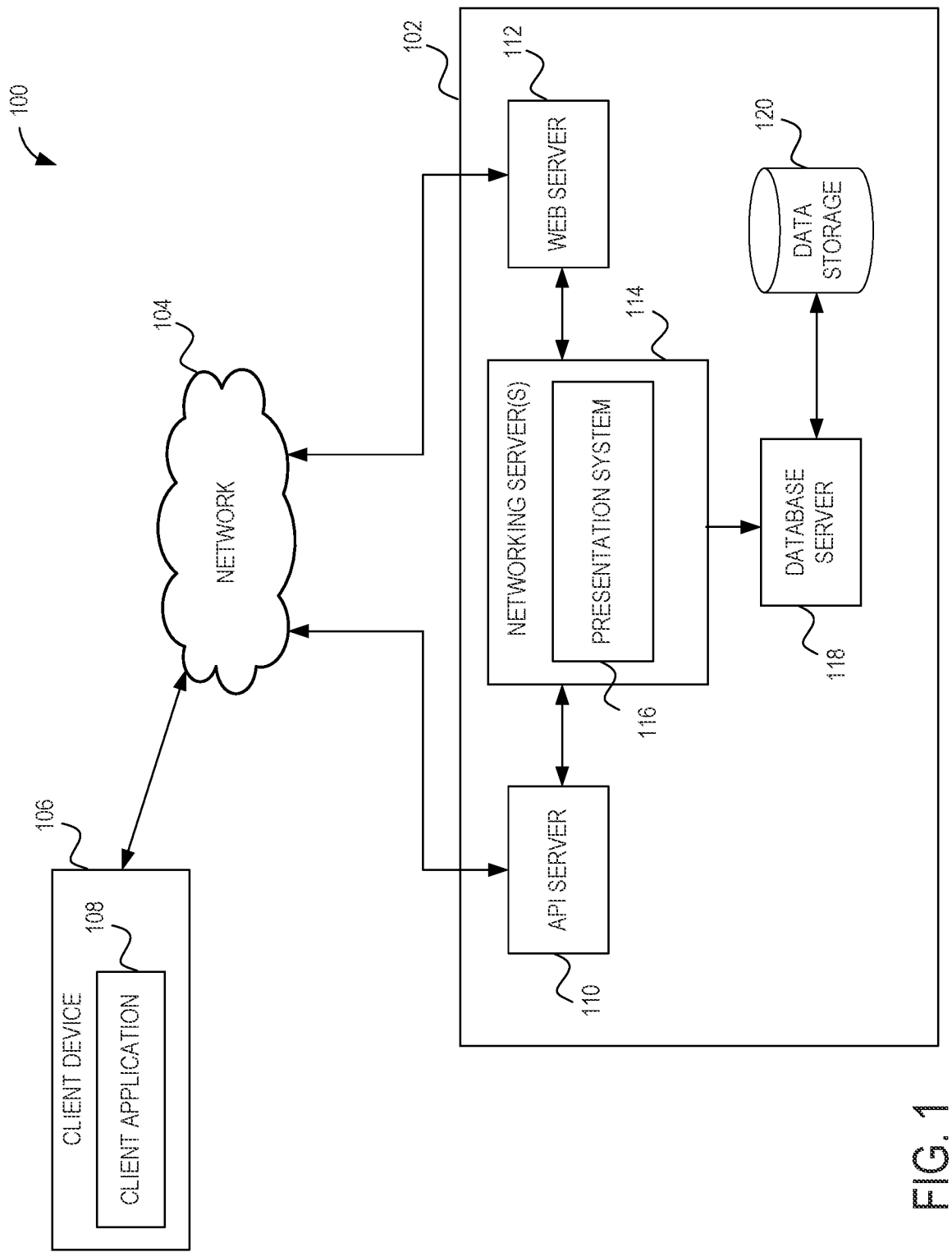
FIG. 1 is a diagram illustrating a network environment suitable for providing an automatic solution for auto-adjusting display time of media items based on content intelligence, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments analyze content of a media item (e.g., a slide) and determines a total display time for a media item based on the content within the media item. The total display time is then automatically applied to the media item resulting in an automatically adjusted display time for the media item. As such, example embodiments described herein may obviate a need for certain efforts or computing resources that otherwise would be involved in repeatedly processing numerous user inputs regarding duration/time settings for multiple media items and rendering numerous iterations of the media presentation during testing of the display times.

Currently, most presentation applications, photo or video editor applications, and media organizer applications support either setting default display durations for all media items (e.g., slides), or a user must manually add/change a display duration for each media item. Typically, while presenting an automatic media presentation (e.g., a slideshow where the slides transition automatically at a predetermined duration), the most common mistake made by users is to set all media items to the same display time. For example, the user usually exports the media presentation with a default display time or increase/decrease the default display time but keep it common to all the media items. It is noted that media items can include slides, document pages, photos, video segments, or any other visual display of information.

Furthermore, some users may spend a lot of manual effort to set an optimal display duration for each media item. However, since the user is familiar with the content on the media item, the user typically does not have any issues with comprehending the media item and often sets display duration that are not long enough for viewers who are unfamiliar with content of the media item. If viewers have difficulty focusing on the media items and/or comprehending details of the media items, the viewers may lose interest or miss the information that is being conveyed.

Because media items comprise different content that require different amount of time to comprehend, setting a same display duration (also referred to herein as "display time") for all media items will result in the viewers not able to completely comprehend the content of all media items. Example embodiments address these issues by providing a technical solution that uses content intelligences using machine learning models to automatically analyze content in each media item and set an optimal display duration for each media item in a media presentation. The machine learning models are trained on existing media presentations (e.g., slideshows) having various content characteristics. The models are then applied to new media (e.g., a new slide deck, new video content, new set of photos) to set a display time for each media item (e.g., slide, photo) in the new media. Accordingly, the present disclosure provides technical solutions that automatically, without human intervention, generates media presentations (e.g., slideshows) with each media item displayed at its optimal display time.

As a result, one or more of the methodologies described herein facilitate solving the technical problem of displaying media items for a duration that ensures viewer comprehension. The display durations are determined and automatically applied to the media items by a system that analyzes the content in each media item and sets the display times accordingly. As such, one or more of the methodologies described herein may obviate a need for certain efforts or computing resources that otherwise would be involved in repeatedly processing numerous user inputs regarding duration settings for multiple media items and rendering numerous iterations of the media presentation during testing of the display times. Examples of such computing resources include processor cycles, network traffic, memory usage, data storage capacity, power consumption, network bandwidth, and cooling capacity.

FIG. 1 is a diagram illustrating a network environment 100 suitable for providing an automatic solution for auto-adjusting play time of media items based on content intelligence in accordance with example embodiments. A network system 102 provides server-side functionality via a communication network 104 (e.g., the Internet, wireless network, cellular network, or a Wide Area Network (WAN)) to client devices 106 that each includes a client application 108. In example embodiments, the network system 102 trains and uses machine learning models to analyze content within media items of a media. The media comprises a document or a collection of data that is presented during a media presentation, such as, for example, a slide deck or a series of photos. The analysis is then used to automatically set a display duration for each media item (e.g., a slide, a photo, a video) of the media for a media presentation.

In example embodiments, the client device 106 is a device of a user of the network system 102 that wants to create or view a media presentation created from a plurality of media items that are each displayed at a corresponding display time. The client device 106 includes the client applications 108, one of which can be used to generate and/or view the media presentation. For example, the client applications 108 can include a presentation application (or a portion thereof) that can apply the machine learning models (also referred to herein as "machine trained models") to the plurality of media items to determine a display time for each media item and a total view time for the media based on all the display times of the plurality of media items.

The client device 106 interfaces with the network system 102 via a connection with the network 104. Depending on the form of the client device 106, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 104 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks.

In another example, the connection to the network 104 is a Wireless Fidelity (Wi-Fi, IEEE 802.111.x type) connection, a Worldwide Interoperability for Microwave Access (WiMAX) connection, or another type of wireless data connection. In such an embodiment, the network 104 includes one or more wireless access points coupled to a local area network (LAN), a wide area network (WAN), the Internet, or another packet-switched data network. In yet another example, the connection to the network 104 is a wired connection (e.g., an Ethernet link) and the network 104 is a LAN, a WAN, the Internet, or another packet-switched data network. Accordingly, a variety of different configurations are expressly contemplated.

The client device 106 may comprise, but is not limited to, a smartphone, tablet, laptop, multi-processor systems, microprocessor-based or programmable consumer electronics, game consoles, set-top boxes, a server, or any other communication device that can access the network system 102. In some embodiments, the client device 106 comprises a display module (not shown) to display information (e.g., in the form of user interfaces).

Turning specifically to the network system 102, an application programing interface (API) server 110 and a web server 112 are coupled to, and provide programmatic and web interfaces respectively to, one or more networking servers 114 (or application servers). The networking server(s) 114 host a presentation system 116, which comprises a plurality of components, and which can be embodied as hardware, software, firmware, or any combination thereof. In some embodiments, the presentation system 116 comprises a cloud-based version of a presentation application that allows a user (e.g., a creator) to generate the media presentation. The presentation system 116 will be discussed in more detail in connection with FIG. 2.

The networking servers 114 are, in turn, coupled to one or more database servers 118 that facilitate access to one or more information storage repositories or data storage 120. In some embodiments, the data storage 120 is a storage device storing media presentations and feedback.

In example embodiments, any of the systems, servers, data storage, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 1 may be combined, and the functions described herein for any single component may be subdivided among multiple components. Additionally, any number of client devices 106 may be embodied within the network environment 100. While only a single network system 102 is shown, alternative embodiments contemplate having more than one network system 102 to perform server operations discussed herein for the network system 102 (e.g., each localized to a particular region).

Figure 2:
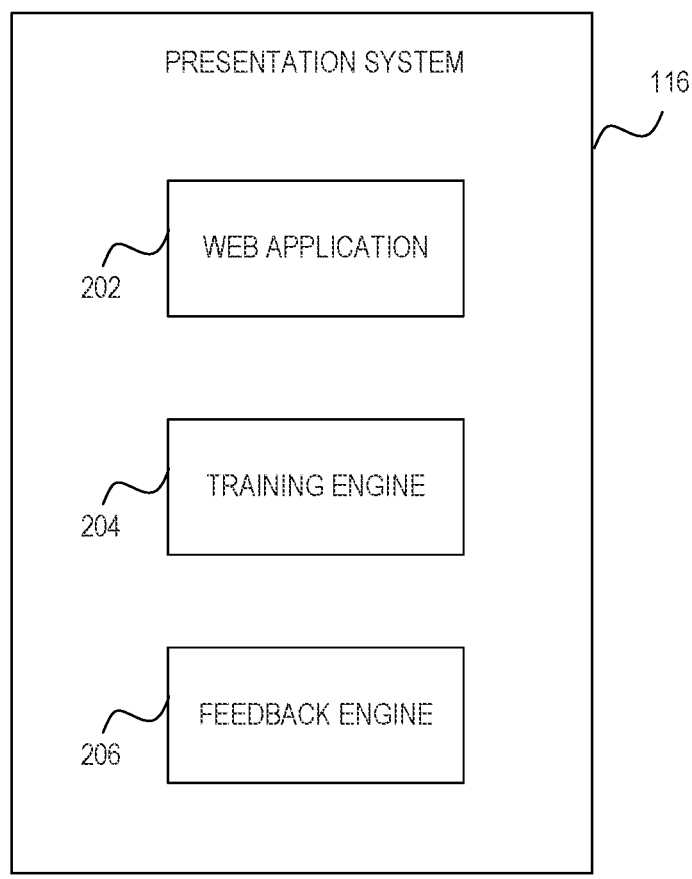
FIG. 2 is a diagram illustrating a presentation system, according to some example embodiments.

FIG. 2 is a diagram illustrating components of the presentation system 116, according to some example embodiments. In some embodiments, the presentation system 116 comprises a cloud-based version of a presentation application that allows a user (e.g., a creator) to generate the media presentation. The presentation system 116 may also machine-train models that are used by the presentation application to determine the display times. As such, the presentation system 116 comprises a web application 202, a training engine 204, and a feedback engine 206.

The web application 202 comprises a cloud-based version of the presentation application that generates media presentations. For example, the web application 202 can provide access to PowerPoint, a video editor application, or any media organizer application via the cloud. As discussed above, a presentation application (i.e., a client application 108) at the client device 106 can comprise the same components as the web application 202 and/or exchange data between the two presentation applications. Such a client application 108 and/or web application 202 (collectively referred to as "presentation application") will be discussed in more detail in connection with FIG. 3.

The training engine 204 is configured to machine-train models that are used by the presentation application. In example embodiments, the training involves training models that determine weights that are applied to different types of content in media items during runtime. The training engine 204 may also receive feedback (e.g., amount of time users actually took to view media items with different combinations of content types; manual adjustments to display times) from users that have viewed media items or media presentations and retrains the models based on the feedback.

More specifically, the training engine 204 takes as input, datasets of previous media having media items with different content types (or combination of different content types) and an indication of amount of time users took to view media items with different combinations of content types. Using these inputs, the training engine 204 determines various weights that are applicable to different content types. For example, the training engine 204 access sample segments/media items containing different combinations of content types such as, for example, charts, images with low aesthetics, images with high aesthetics, images with a single face, images with multiple faces, images with fewer objects, images with more objects, and/or videos. The training engine 204 also access an amount of time it took users to view and understand the different combination of content types (e.g., how long did a user view a media item before moving one to a next media item).

Based on the accessed information, the training engine 204 calculates a median time it took for users to understand each content type. The median time provides a weight that is applied during runtime. In one example embodiment, the weight for viewing a chart ($W_c$) is 3.2 seconds, which indicates that it typically takes a viewer 3.2 second to understand a chart on a media item. The weight based on aesthetics ($W_a$) is 2.15 seconds, while a weight based on faces ($W_f$) is 3.9 seconds per face in one embodiment. Furthermore, a weight based on objects ($W_o$) is 1.78 seconds per object in accordance with an embodiment. These weights may change over time as more feedback is received from users.

The feedback engine 206 obtains the feedback that is used to retrain the training engine 204. In some cases, the feedback can be obtained from viewers of media presentations generated using the presentation application. In other cases, the feedback can be obtained from users that adjust/change a display time that was previously, automatically set by the presentation application. Further still, sample media may be provided to users and the users asked to indicate how long it took for them to understand each sample. This information can then be used as a dataset by the training engine 204.

Figure 3:
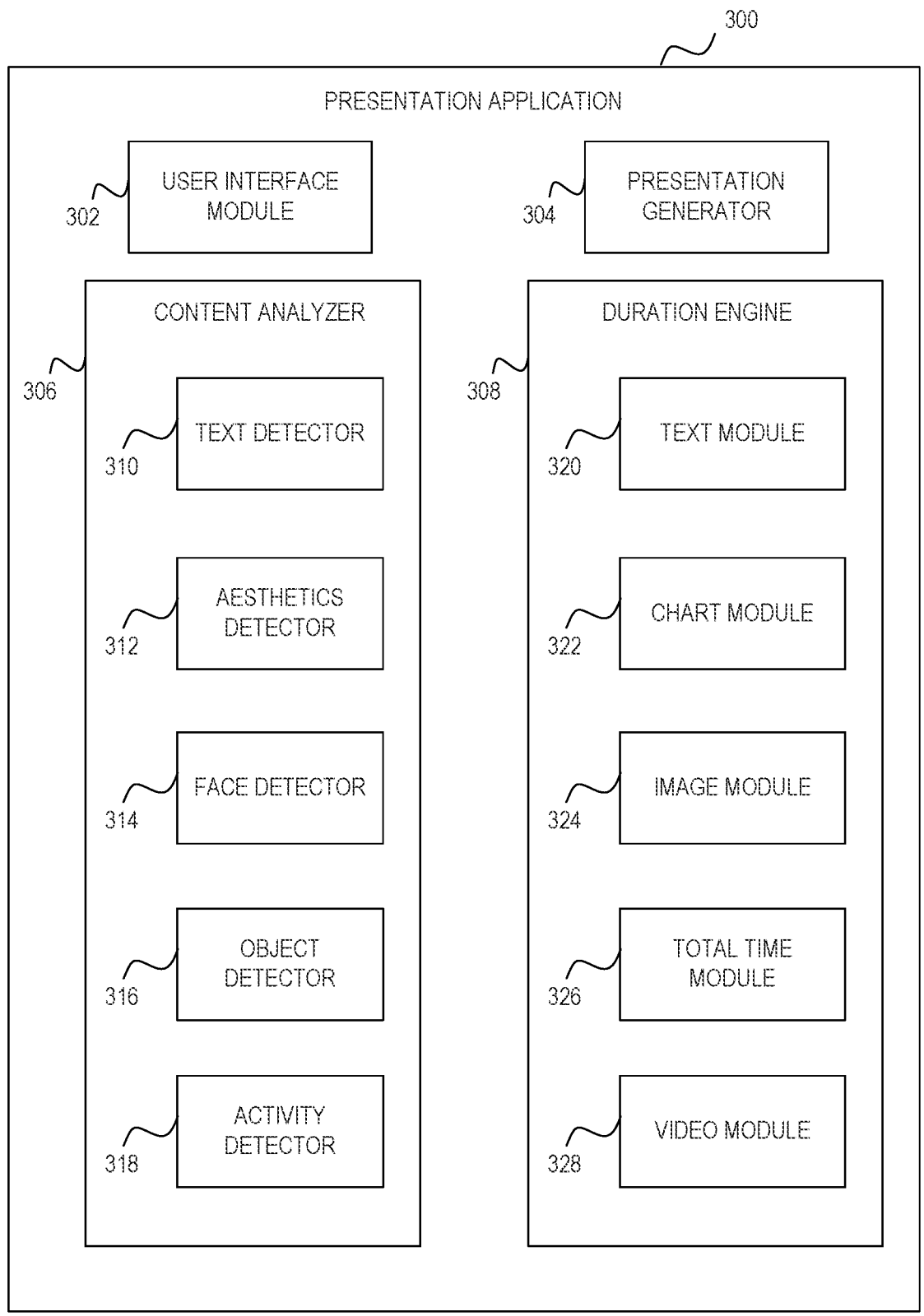
FIG. 3 is a block diagram illustrating components of a presentation application that auto-adjusts the display time of media items, according to some example embodiments.

Referring now to FIG. 3, a block diagram illustrating components of a presentation application 300 that auto-adjusts the display time of media items, in accordance with example embodiments, is shown. The presentation application 300 is configured to apply machine learning models to auto-adjust the display time of media items based on content within the media items. To enable these operations, the presentation application 300 comprises a user interface module 302, a presentation generator 304, a content analyzer 306, and a duration engine 308 all communicatively coupled together via a bus.

In some embodiments, the presentation application 300 is embodied (wholly or partially) within the presentation system 116 of the network system 102. In other embodiments, the presentation application 300 or a portion thereof is embodied at the client device 106 (e.g., as part of the client application 108). As such, some embodiments may have the client device 106 performing the operations of the presentation application 300, while the presentation system trains the models that are used by the presentation application 300.

The user interface module 302 is configured to manage display of user interfaces that enable a user to create, view, and/or adjust media presentations. In some embodiments, the user interface module 302 causes presentation of a user interface that provides one or more fields that allow a user to manually set or adjust the display time that has been automatically applied to a media item by the presentation application 300. In these cases, any manual input can be transmitted or accessed by the feedback engine 206 and used to retrain the machine learning models. Additionally, in some cases, the overall media presentation may be limited to an allotted presentation time (e.g., an allotted amount of time for presenting the media presentation). Here, the user interface provides a field for entry of the total view time.

Further still, the user interface module 302 can cause display of the media item for a total display time automatically determined by the presentation application. The user interface module 302 can also cause display of the media item with an indication of a corresponding total display time displayed relative to the media item (e.g., next to or overlaid on the media item).

The presentation generator 304 is configured to generate the media presentation (e.g., slideshow with automatic display times) from the media (e.g., slide deck). In example embodiments, the presentation generator 304 triggers the content analyzer 306 to analyze the content in the media items and triggers the duration engine 308 to determine a total display time for each media item of the media. Given, the results of the duration engine 308, the presentation generator 304 determines a total view time for the media and generates the media presentation by setting display time for each media item to their respective, calculated, total display time. The total view time for the media is an aggregation of the total display times of all the media items of the media. The presentation generator 304 can cause a machine action based on the total display time to occur. For example, the presentation generator 304 provides the media presentation to the user interface module 302, which then causes display of the media presentation including each media item for its respective total display time or causes display of a user interface that allows the user to adjust the total display time for a media item.

In cases where an indication of an allotted presentation time is received, the presentation generator 304 trigger an adjustment of at least one of the total display times to conform the total view time for the media to the allotted presentation time. In these cases, the presentation generator 304 can use interpolation to scale down the total view time. There may be some media items that may not be adjusted (e.g., those containing video or images), but media items having text could be scaled down.

The content analyzer 306 is configured to analyze the content and content types in each media item in the media. The content types can include, for example, text, charts, images, and video. In some cases, a media item comprises just a single content type, while in other cases, the media item comprises two or more content types (e.g., a combination of a photo, a video, and text). Further still, the media item can have multiples of the same content type (e.g., three photos on a single slide; two photos and text on a single slide). As such, the content analyzer 306 comprises a text detector 310, an aesthetics detector 312, a face detector 314, an object detector 316, and an activity detector 318. Each of these detectors may apply a respective machine learning model trained on a dataset of past corresponding content type samples by the training engine 204.

The text detector 310 is configured to analyze text in each media item. In example embodiments, the text detector 310 identifies a number of words (n) in the text of the media item. The identifying of the number of words includes filtering out spaces as well as various words such as articles (e.g., the, a) and prepositions (e.g., by, to). The result is a filter words list with a filter number of words (m) that is a subset of the number of words (n).

The aesthetics detector 312 is configured to determine an aesthetic score for an image of a media item. An image having a high aesthetic score will grab more attention of a user (and thus more time viewing). As such, aesthetic score plays an important role in calculating display time. In example embodiments, the aesthetics detector 312 applies a machine trained aesthetics model that calculates an aesthetic score for the image. Aesthetics depends on various factors such as, what is the saturation of the image, what is the color combination, what is the contrast ratio, and what is the hue saturation. The combination of these factors gives information on whether the image is aesthetically pleasing, easy to look at, and/or blurred, for example. As such, the aesthetics detector 312 determines the amount of saturation, contrast, and hue saturation along with color combination and uses this information to determine the aesthetic score.

The face detector 314 is configured to analyze each media item to detect unique faces. In example embodiments, the face detector 314 uses a facial recognition algorithm or model to detect the unique faces and detect the number of faces. Images that include more people or faces typically will require more time and attention to comprehend.

The object detector 316 is configured to analyze each media item to detect a number of unique objects in each media item. In example embodiments, the object detector 316 uses smart object detection or recognition algorithm/model to detect the objects. Similar to faces, images with more objects will also require more time and attention to comprehend.

The activity detector 318 is configured to analyze each media item to determine a level of activity or motion in a video of a media item. For example, if the video is five seconds long and has high activity, then the user will not be able to focus on any other content on the media item. Conversely, if the video is of low activity, then focus time to look at the video will be less. In some embodiments, the activity detector 318 traverses through all frames of the video and identifies an average motion and activity filter value (AM) for the media item. In example embodiments, AM is determined using motion detection technology which detect how much of the content has changed between frames. In one example, $$AM = (\text{sum of motion filter value of all frames})/(\text{number of frames}) = (S1_{ij} + S2_{ij} + \ldots + Sk_{ij})/k,$$

where k is the number of frames.

For efficiency, every other frame can be analyzed to reduce processing power, in accordance with an alternative embodiment.

In example embodiments, the content analyzer 306 works with the duration engine 308, which determines, based on the analysis performed by the content analyzer 306, the display time for each content type in a media item and subsequently, the total display time for the media item (should the media item contain more than one content type). Additionally, the duration engine 308 can determine a total view for the media by deriving the total display time for each media item in the media and aggregating the total display times for the media items of the media. To enable these operations, the duration engine 308 comprises a text module 320, a chart module 322, an image module 324, a total time module 326, and a video module 328.

In example embodiments, the text module 320 determines a display time based on an amount of text in a media item. On average, a human takes 0.3 seconds to read one word. Using the number of filtered words (m) determined by the text detector 310, the text module 320 determines a time to read the words on the media item. In one example, the time to read, $t_1$, is calculated as $t_1 = 0.3 \cdot m$, where 0.3 is the average human reading time. It is noted that this average is configurable and can be changed by a user or a model.

The chart module 322 determines display time for chart(s), $t_2$, that are in a media item. Taking the number of charts identified by the object detector 316, the chart module 322 determines $t_2$, in one example, as $t_2 = W_c(\text{NumCharts})$, where NumCharts represents the number of charts in the media item and $W_c$ is the weight for charts determined by the training engine 204. In one embodiment, $W_c$ is determined to be 3.2 seconds.

In a further embodiment, the content of the chart may affect the display time for media items with charts. For example, if the chart has less text/numbers, it will be easier to read. In contrast, if the chart has more text/numbers, then it will take longer to comprehend. In one embodiment, text in the chart is analyzed by a component of the content analyzer 306 (e.g., the text detector 310 or the object detector 316) using any library that provides text from an image. Based on a number of words, $N_1$, determined from this analysis, weightage can be given to the chart, for example, as $t_c = N_1 \cdot K$, where K is a weight associated with reading an item within the chart. With a minimum time ($t_{min}$) and a maximum time ($t_{max}$) set (e.g., as a default), $t_{chart} = \text{Min}(\text{Max}(t_{min}, t_c), t_{max})$. In some embodiments, this determination is performed for each chart in a media item and the $t_{chart}$ for each chart aggregated to derive $t_2$.

The image module 324 determines the display time for images in a media item. Since images with high aesthetic can grab more attention for the user, the aesthetic score determined by the aesthetic detector 312 plays an important role in determining the display time for images in a media item. Along with aesthetic score, a number of objects and faces detected in the image also impacts the time it takes to comprehend the content. For example, images with more people (e.g., a group photo) and objects will require more time and attention to comprehend.

Assume an image has multiple unique faces (NumFaces$_i$), multiple objects (NumObjects$_i$), and an aesthetic score of IA$_i$. The image module 324 determines an effective display time from aesthetics, in one embodiment, using an equation=$W_a(\Sigma IA_i)$, from i=0 to j, where j is a number of images in the media item, IA$_i$ is the aesthetic score (score range 0 to 100) and $W_a$ is a weight considered for aesthetics. In one example, $W_a$, as determined by the training engine 204, is 2.15 seconds.

The image module 324 also determines an effective display time for unique faces, in one embodiment, using an equation=$W_f(\Sigma \text{NumFaces}_i)$, from i=0 to j, where j is the number of images in the media item, NumFaces$_i$ represents the number of faces in ith image and $W_f$ is the weight considered for faces in total duration. In one example, $W_f$, as determined by the training engine 204, is 3.9 seconds.

Additionally, the image module 324 determines an effective display time from objects, in one embodiment, using an equation=$W_o(\Sigma \text{NumObjects}_i)$, from i=0 to j, where j is a number of images in the media item, NumObjects$_i$ represents the number of objects in ith image, and $W_o$ is a weight considered for objects in total duration. In one example, $W_o$, as determined by the training engine 204, is 1.78 seconds.

Finally, the image module 324 determines the display time for images from the calculation of the effective display times. That is, the display time based on a content type of images, $t_3$, is determined, in one embodiment, as $t_3=(W_a(\Sigma IA_i)/1.00+W_f(\Sigma \text{NumFaces}_i)+W_o(\Sigma \text{NumObjects}_i)$ from i=0 to j, where j is the number of images in the media item.

The total time module 326 determines an effective total display time for each media item. Assume that a minimum time allotted to a slide is $t_{min}$. The effective total display time, in one example, is:

$$t_{total}=t_1+t_2+t_3$$

$$t_{total}=t_{min}>t_{total}?t_{min}:t_{total}$$

That is, if the effective total display time is less than $t_{min}$, then it is $t_{min}$; otherwise, it is the effective total display time.

The video module 328 determines a total display time when a video is in a media item. To calculate this total display time, the video module 328 uses the average motion and activity filter value (AM) for the media item determined by the activity detector 316. Letting d be the duration of the video, then $$t_{total}=\text{Maximum}(d, t_{total}+d*\text{AM}),$$

where d=duration of the video (in seconds).
As such, the total display time is the maximum of either the duration of the video or the effective total time plus the duration of the video times the average motion and activity filter value.

While FIG. 3 illustrates the content analysis occurring in components separate from components used to determine display duration, some embodiments may combine the functions of a content analyzer with their corresponding time-determining module. For example, the functions of the text detector 310 can be combined with the functions of the text module 320 in a single component.

Figure 4:
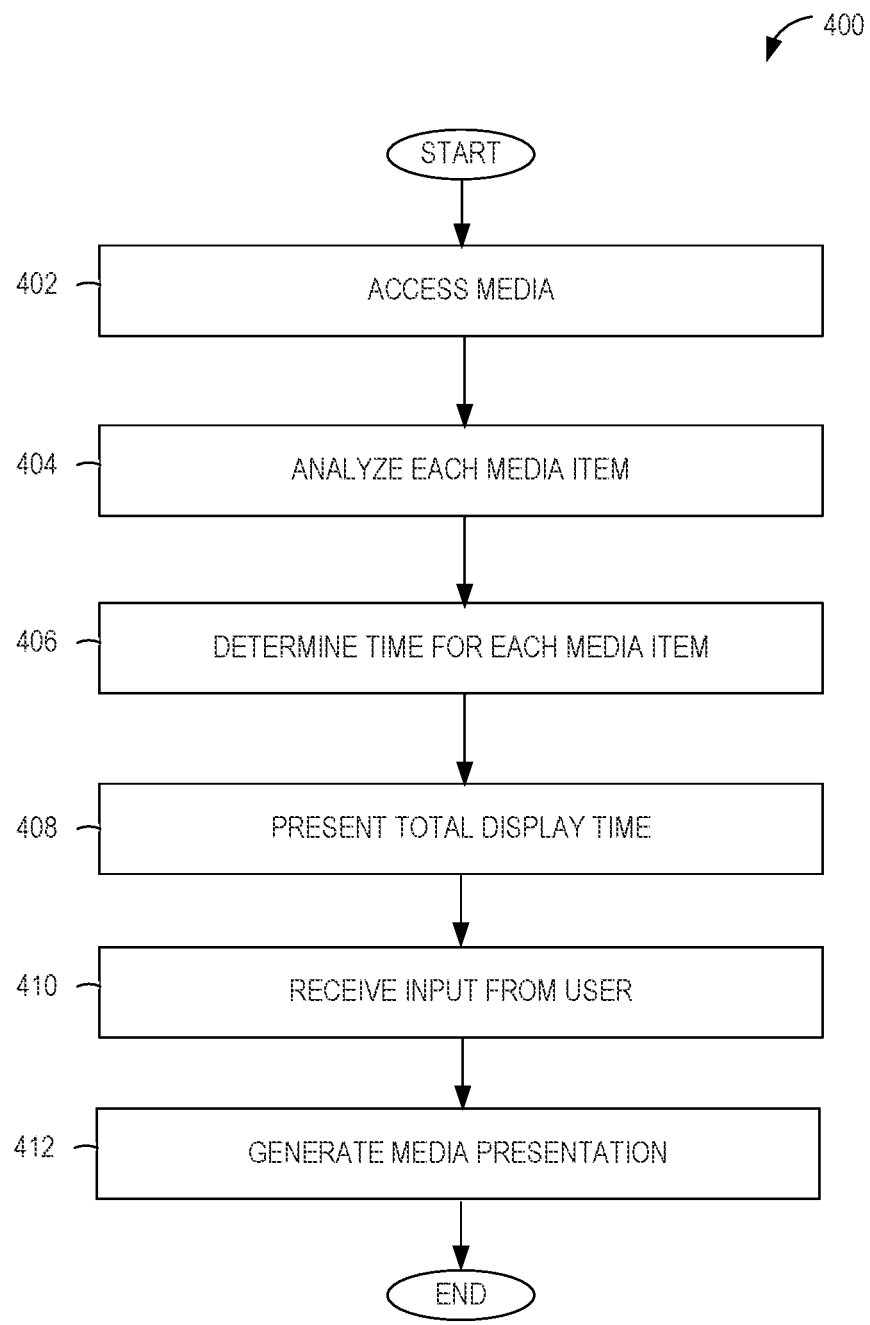
FIG. 4 is a flowchart illustrating operations of a method for auto-adjusting, play time of media based on content intelligence, according to some example embodiments.

FIG. 4 is a flowchart illustrating operations of a method 400 for auto-adjusting display time of media items based on content intelligence, according to some example embodiments. Operations in the method 400 may be performed by the presentation application 300, using components described above with respect to FIG. 3. Accordingly, the method 400 is described by way of example with reference to the presentation application 300. However, it shall be appreciated that at least some of the operations of the method 400 may be deployed on various other hardware configurations or be performed by similar components residing elsewhere in the network environment 100. Therefore, the method 400 is not intended to be limited to the presentation application 300.

In operation 402, the presentation generator 304 accesses the media (e.g., a slide deck, a collection of photos) that a user wants to convert into a media presentation (e.g., a slideshow). The media comprises a plurality of media items (e.g., a plurality of slides, a plurality of photos).

In operation 404, the content analyzer 306 analyzes each media item to determine the content type(s) in each media item and attributes e.g., numbers, scores) associated with the content type(s). The content type in each media item can include one or more of text, charts, images, and video. In some cases, a media item comprises just a single content type, while in other cases, the media item comprises two or more content types (e.g., a photo, a video, and text). Further still, the media item can have multiples of the same content type (e.g., two photos on a single slide) or multiples of the same content type and multiple content types (e.g., two photos and text on a single slide).

Depending on the content type(s) associated with each media item, one or more of the text detector 310, the aesthetics detector 312, the face detector 314, the object detector 316, or the activity detector 318 performs an analysis of each media item. In example embodiments, the text detector 310 identifies a number of filtered words in the media item, whereby the words are filtered for articles and prepositions.

In example embodiment, the aesthetics detector 312 determines an aesthetic score for each image of a media item. In particular, the aesthetics detector 312 determines the amount of saturation, contrast, and hue saturation along with color combination in an image of the media item. This information is then used to determine the aesthetic score.

The face detector 314 uses a facial recognition algorithm or model to detect the unique faces and determine a number of unique faces in each media item. Similarly, the object detector 316 uses smart object detection or recognition algorithm/model to detect a number of objects in each media item.

In example embodiments, the activity detector 318 determines a level of activity or motion in a video of a media item. In some cases, the activity detector 318 uses motion detection technology to detect how much content has changed between frames of the video to determine the level of activity. The output of the activity detector 318 comprises the average motion and activity filter value (M).

In operation 406, a total display time for each media item is determined by the duration engine 308. Operation 406 will be discussed in more detail in connection with FIG. 5

In operation 408, the total display time for each media item is presented to the user by the user interface module 302. In some embodiments, the user interface module 302 causes presentation of a user interface that displays the media item and provide an indication of the total display time. The indication can be displayed relative to the media item (e.g., next to or overlaid on the media item). In some cases, the user can view the media item for the total display time. In some cases, the user interface also provides one or more fields that allow the user to adjust the total display time that has been automatically applied to a media item by the presentation application 300.

In operation 410, the user interface module 302 receives input from the user. In some embodiments, the input comprises an adjustment to the total time made by the user in operation 408. The input also can be an indication to generate the media presentation whereby the media items will be displayed at the automatically determined total display (or adjusted time).

In operation 412, the presentation generator 304 generates the media presentation. The presentation generator 304 generates the media presentation by setting display time for each media item to their respective total display time. Additionally, the presentation generator 304 can cause a machine action based on the total display time. For example, the presentation generator 304 provides the media presentation to the user interface module 302, which then causes display of the media presentation including each media item for its respective total display time.

Figure 5:
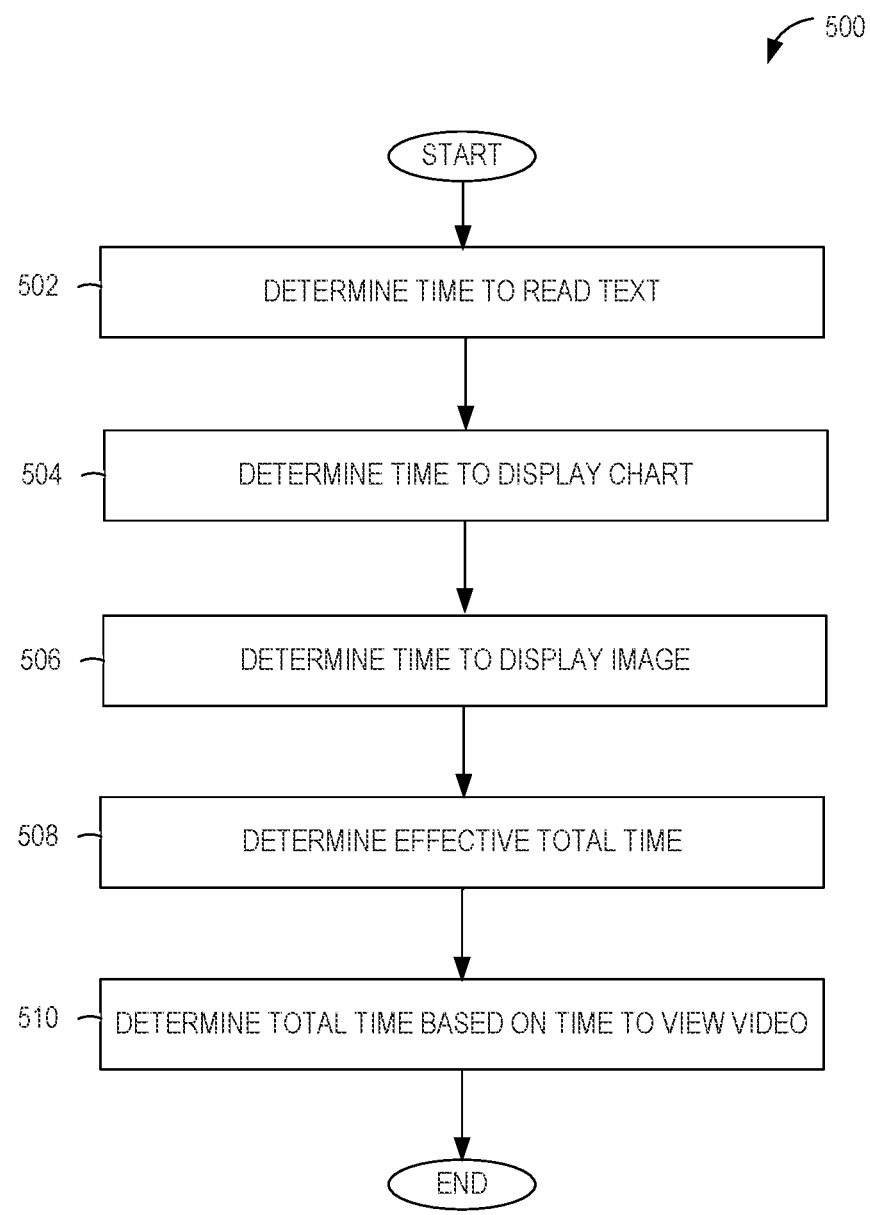
FIG. 5 is a flowchart illustrating operations of a method for determining a total display time for each media item, according to some example embodiments.

FIG. 5 is a flowchart illustrating operations of a method 500 (operation 406) for determining a total display time for each media item, according to some example embodiments. Operations in the method 500 may be performed by the presentation application 300, using components described above with respect to FIG. 3. Accordingly, the method 500 is described by way of example with reference to the presentation application 300. However, it shall be appreciated that at least some of the operations of the method 500 may be deployed on various other hardware configurations or be performed by similar components residing elsewhere in the network environment 100. Therefore, the method 500 is not intended to be limited to the presentation application 300.

In operation 502, the text module 320 determines a display time for text (a time need to read text) of the media item. Using the number of filtered words (m) determined by the text detector 310, the text module 320 determines a time to read the words on the media item. In one example, the time to read, $t_1$, is calculated as $t_1=0.3*m$, where 0.3 is the average human reading time. It is noted that this average is configurable and can be changed by a user.

In operation 504, the chart module 3221 determines a display time for chart(s). Taking the number of charts identified by the object detector 316, the chart module 322 determines the display time for charts, $t_2$. In one example, $t_2=W_c(NumCharts)$, where NumCharts represents the number of charts in the media item and $W_c$ is the weight for charts determined by the training engine 204.

In operation 506, the image module 324 determines a display time for image(s) in the media item. In example embodiments, the image module 324 determines an effective display time from aesthetics, an effective display time based on the number of faces in the media item, an effective display time based on the number of objects in the media item. The display time for images is a combination of these effective display times.

In operation 508, the total time module 326 determines an effective total display time for the media item. In example embodiments, the effective total display time comprises a summation of the display time based on text in the media item ($t_1$), the display time for charts ($t_2$), and display time for images ($t_3$). In some embodiments, a minimum time allotted to a slide ($t_{min}$) is determined. This minimum time may be default by the presentation application 300, derived by machine-learning, or set by a user. If the effective total display time is less than $t_{min}$, then the total time is set to $t_{min}$; otherwise, it is the calculated effective total display time.

In operation 510, the video module 328 determines a total display time based on time recommended to view a video in a media item. With d being the duration of the video in seconds, the total time is Maximum (d, $t_{total}$+d*AM). That is, the total time is the maximum of either the duration of the video or the effective total time plus the duration of the video times the average motion and activity filter value.

It is noted that not all operations of the method 500 need to be performed for each media item. For example, if the media item does not include an image, then operation 506 does not need to be performed. Similarly, if the media item does not have a video, then operations 510 and 512 are not needed. Here, the effective total time determined in operation 508 is the final total display time for the media item. Additionally, the operations can be performed in a different order. For example, the determination of the time to view an image (operation 506) can be performed prior to determining the time to read text (operation 502).

Figure 6:
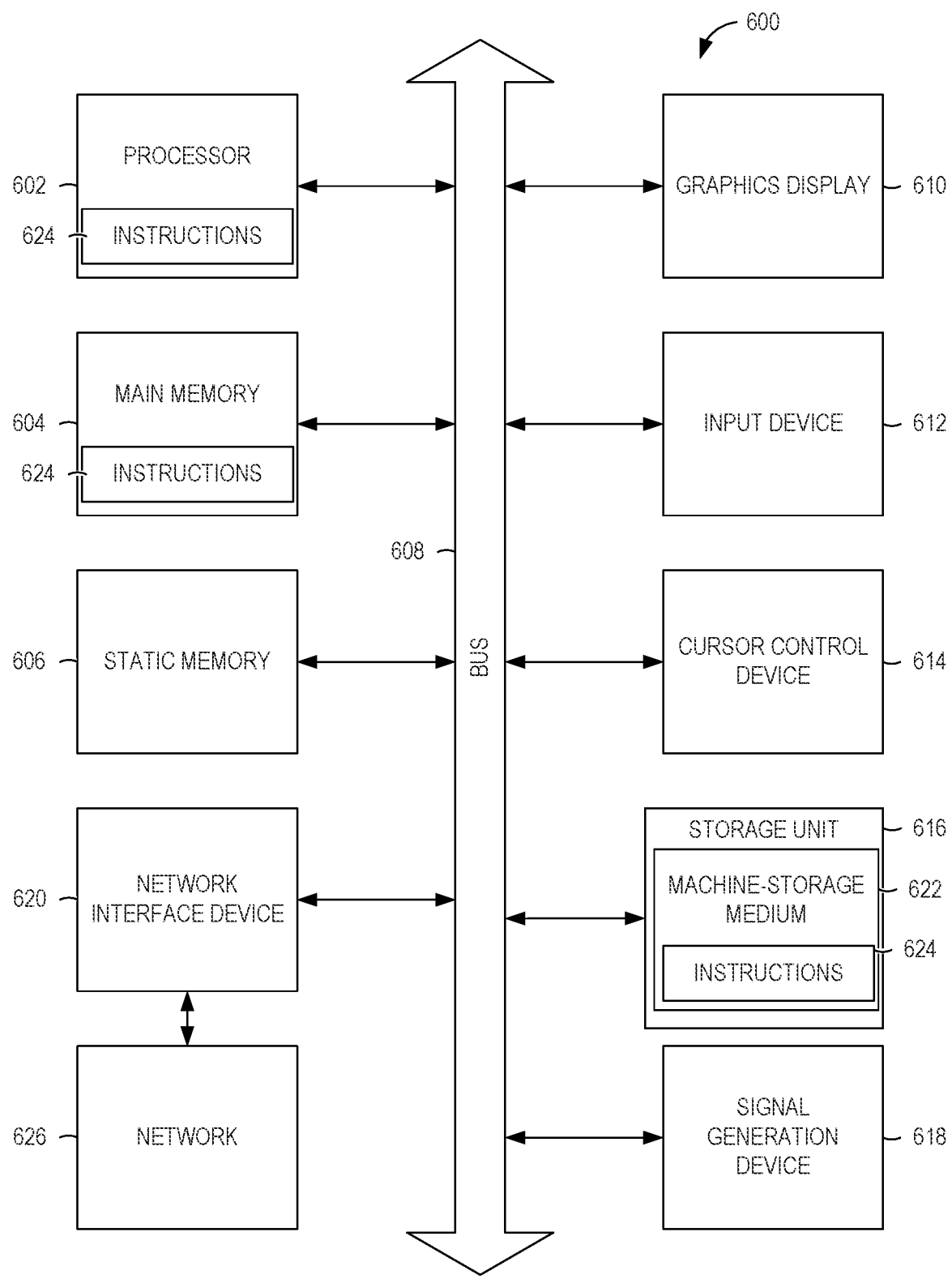
FIG. 6 is a block diagram illustrating components of a machine, according to some example embodiments, able to read instructions from a machine-storage medium and perform any one or more of the methodologies discussed herein.

FIG. 6 illustrates components of a machine 600, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 6 shows a diagrammatic representation of the machine 600 in the example form of a computer device e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flow diagrams of FIG. 5. In one embodiment, the instructions 624 can transform the general, non-programmed machine 600 into a particular machine (e.g., specially configured machine) programmed to carry out the described and illustrated functions in the manner described.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit ((PU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-storage medium 622 (e.g., a tangible machine-storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-readable media (e.g., tangible and non-transitory machine-readable media). The instructions 624 may be transmitted or received over a network 626 via the network interface device 620.

In some example embodiments, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions Aid Machine-Storage Medium

The various memories (i.e., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions anchor data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 622 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms.

Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for auto-adjusting display time of media items based on content intelligence. The method is performed by one or more hardware processors and comprises accessing media comprising a plurality of media items, a media item of the plurality of media items comprising a first content type. Based on the first content type, the method performs machine analysis associated with the first content type and based on the machine analysis, determines a first display time for the first content type of the media item. The method then derives a total display time for the media item based on the first display time and causes a machine action based on the total display time for the media item. As a result, the method facilitates solving the technical problem of displaying media items for a duration that ensures viewer comprehension by determining the display time for each content type and automatically applying the total display time to the media item. As such, the method may obviate a need for certain efforts or computing resources that otherwise would be involved in repeatedly processing numerous user inputs regarding duration settings for multiple media items and rendering numerous iterations of the media presentation during testing of the display times. Examples of such computing resources include processor cycles, network traffic, memory usage, data storage capacity, power consumption, network bandwidth, and cooling capacity.

In example 2, the subject matter of example 1 can optionally include wherein the media item comprises a second content type and the method further comprises based on the second content, performing machine analysis associated with the second content type; and based on the machine analysis associated with the second content type, determining a second display time for the second content type of the media item, wherein deriving the total display time for the media item comprises aggregating the first display time and the second display time.

In example 3, the subject matter of any of examples 1-2 can optionally include determining a total view time for the media by deriving a total display time for each of the plurality of media items and aggregating the total display times including the total display time of the media item.

In example 4, the subject matter of any of examples 1-3 can optionally include receiving an indication of a presentation time allotted to the media; and adjusting at least one of the total display times to conform the total view time for the media to the presentation time allotted.

In example 5, the subject matter of any of examples 1-4 can optionally include receiving an indication to generate a presentation output for the media, the presentation output comprising a video or a slide presentation that includes the plurality of media items each being displayed at its respectively total display time; and generating the presentation output.

In example 6, the subject matter of any of examples 1-5 can optionally include receiving an adjustment to the total display time for the media item; and using the adjustment as feedback to adjust a weighting function used to calculate the total display time.

In example 7, the subject matter of any of examples 1-6 can optionally include wherein the first content type is text and determining the first display time comprises determining a number of filtered words displayed on the media item; and deriving the first display time based on the number of filtered words.

In example 8, the subject matter of any of examples 1-7 can optionally include wherein the first content type is charts and determining the first display time comprises determining a number of charts displayed on the media item; and deriving the first display time based on the number of charts.

In example 9, the subject matter of any of examples 1-8 can optionally include wherein the first content type is images and determining the first display time comprises determining an aesthetic score for an image; determining a number of objects and faces in the image; and deriving the first display time based on the aesthetic score, number of objects, and number of faces.

In example 10, the subject matter of any of examples 1-9 can optionally include wherein the first content type is video and determining the first display time comprises for each frame of the video, identifying a motion and activity filter value; based on the motion and activity filter value for each frame, determining an average motion and activity filter value for the video; and deriving the first display time by applying a duration of the video to the average motion and activity filter value.

In example 11, the subject matter of any of examples 1-10 can optionally include generating a weight used to determine the first display time, the generating comprising receiving a training data set that includes sample media items and an amount of time to view of each of the sample media items; and based on the sample media items, determining a median time to view the first content type.

In example 12, the subject matter of any of examples 1-11 can optionally include wherein the plurality of media items comprises a plurality of slides, video segments, or photos.

In example 13, the subject matter of any of examples 1-12 can optionally include wherein causing the machine action based on the total display time for the media item comprises causing a display component to display the media item for the total display time.

In example 14, the subject matter of any of examples 1-13 can optionally include wherein causing the machine action based on the total display time for the media item comprises causing a display component to display the media item and an indication of the total display time relative to the media item.

Example 15 is a system for auto-adjusting display time of media items based on content intelligence. The system comprises one or more hardware processors and a memory storing instructions that, when executed by the one or more hardware processors, cause the one or more hardware processors to perform operations comprising accessing media comprising a plurality of media items, a media item of the plurality of media items comprising a first content type; based on the first content type, performing machine analysis associated with the first content type; and based on the machine analysis, determining a first display time for the first content type of the media item. The system derives a total display time for the media item based on the first display time and causes a machine action based on the total display time for the media item. As a result, the system facilitates solving the technical problem of displaying media items for a duration that ensures viewer comprehension by determining the display time for each content type and automatically applying the total display time to the media item. As such, the system may obviate a need for certain efforts or computing resources that otherwise would be involved in repeatedly processing numerous user inputs regarding duration settings for multiple media items and rendering numerous iterations of the media presentation during testing of the display times. Examples of such computing resources include processor cycles, network traffic, memory usage, data storage capacity, power consumption, network bandwidth, and cooling capacity.

In example 16 the subject matter of example 15 can optionally include wherein the media item comprises a second content type and the operations further comprise based on the second content, performing machine analysis associated with the second content type; and based on the machine analysis associated with the second content type, determining a second display time for the second content type of the media item, wherein deriving the total display time for the media item comprises aggregating the first display time and the second display time.

In example 17, the subject matter of any of examples 15-16 can optionally include wherein the operations further comprise determining a total view time for the media by deriving a total display time for each of the plurality of media items and aggregating the total display times including the total display time of the media item.

In example 18, the subject matter of any of examples 15-17 can optionally include wherein causing the machine action based on the total display time for the media item comprises causing a display component to display the media item for the total display time.

In example 19, the subject matter of any of examples 15-18 can optionally include wherein causing the machine action based on the total display time for the media item comprises causing a display component to display the media item and an indication of the total display time relative to the media item.

Example 20 is a computer-storage medium comprising instructions which, when executed by one or more hardware processors of a machine, cause the machine to perform operations for auto-adjusting display time of media items based on content intelligence. The operations comprise accessing media comprising a plurality of media items, a media item of the plurality of media items comprising a first content type. Based on the first content type, machine analysis associated with the first content type is performed and, based on the machine analysis, first display time for the first content type of the media item is determined. A total display time for the media item based on the first display time is then derived and a machine action based on the total display time for the media item is triggered. As a result, the instructions embodied on the storage medium facilitate solving the technical problem of displaying media items for a duration that insures viewer comprehension by determining the display time for each content type and automatically applying the total display time to the media item. As such, the storage medium may obviate a need for certain efforts or computing resources that otherwise would be involved in repeatedly processing numerous user inputs regarding duration settings for multiple media items and rendering numerous iterations of the media presentation during testing of the display times. Examples of such computing resources include processor cycles, network traffic, memory usage, data storage capacity, power consumption, network bandwidth, and cooling capacity.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method performed by one or more hardware processors, the method comprising:
    training one or more machine learning models to determine weights applicable to different content types;
    accessing media comprising a plurality of media items, a media item of the plurality of media items comprising a first content type;
    based on the first content type, performing machine analysis associated with the first content type;
    applying a weight determined by the one or more machine learning models to a result of the machine analysis to determine a first display time for the first content type of the media item;
    determining a second display time for a second content type that is video, the determining the second display time comprising:
        for each frame of the video, identifying a motion and activity filter value;
        based on the motion and activity filter value for each frame, determining an average motion and activity filter value for the video; and
        deriving the second display time by applying a duration of the video to the average motion and activity filter value;
    deriving a total display time for the media item based on the first display time and the second display time;
    causing a machine action based on the total display time for the media item;

receiving feedback based on the machine action; and
retraining at least one of the one or more machine learning models using the feedback.

2. The method of claim 1, wherein the media item comprises a third content type and the method further comprises:
based on the third content type, performing machine analysis associated with the third content type; and
based on the machine analysis associated with the third content type, determining a third display time for the third content type of the media item,
wherein deriving the total display time for the media item comprises aggregating the first display time, the second display time, and the third display time.

3. The method of claim 1, further comprising:
determining a total view time for the media by deriving a total display time for each media item of the plurality of media items and aggregating each total display time including the total display time of the media item.

4. The method of claim 3, further comprising:
receiving an indication of a presentation time allotted to the media; and
adjusting the total display time of at least one media item of the plurality of media items to conform the total view time for the media to the presentation time allotted.

5. The method of claim 3, further comprising:
receiving an indication to generate a presentation output for the media, the presentation output comprising a video or a slide presentation that includes the plurality of media items each being displayed at its respectively total display time; and
generating the presentation output.

6. The method of claim 1, further comprising:
applying an updated weight determined by the retrained one or more machine learning models to a next media item.

7. The method of claim 1, wherein:
the first content type is text;
the performing machine analysis comprises determining a number of filtered words displayed on the media item; and
the first display time is based on the number of filtered words.

8. The method of claim 1, wherein:
the first content type is charts;
the performing machine analysis comprises determining a number of charts displayed on the media item; and
the first display time is based on the number of charts.

9. The method of claim 1, wherein:
the first content type is images;
the performing machine analysis comprises:
determining an aesthetic score for an image; and
determining a number of objects and faces in the image; and
the first display time is based on the aesthetic score, number of objects, and number of faces.

10. The method of claim 1, wherein training the one or more machine learning models comprises:
receiving a training data set that includes sample media items and an amount of time to view of each of the sample media items; and
based on the sample media items, determining a median time to view the first content type.

11. The method of claim 1, wherein the plurality of media items comprises a plurality of slides, video segments, or images.

12. The method of claim 1, wherein causing the machine action based on the total display time for the media item comprises causing a display component to display the media item for the total display time.

13. The method of claim 1, wherein causing the machine action based on the total display time for the media item comprises causing a display component to display the media item and an indication of the total display time relative to the media item.

14. A system comprising:
one or more hardware processors; and
a memory storing instructions that, when executed by the one or more hardware processors, cause the one or more hardware processors to perform operations comprising:
training one or more machine learning models to determine weights applicable to different content types;
accessing media comprising a plurality of media items, a media item of the plurality of media items comprising a first content type;
based on the first content type, performing machine analysis associated with the first content type;
applying a weight determined by the one or more machine learning models to a result of the machine analysis to determine a first display time for the first content type of the media item;
determining a second display time for a second content type that is video, the determining the second display time comprising:
for each frame of the video, identifying a motion and activity filter value;
based on the motion and activity filter value for each frame, determining an average motion and activity filter value for the video; and
deriving the second display time by applying a duration of the video to the average motion and activity filter value;
deriving a total display time for the media item based on the first display time and the second display time;
causing a machine action based on the total display time for the media item;
receiving feedback based on the machine action; and
retraining at least one of the one or more machine learning models using the feedback.

15. The system of claim 14, wherein the media item comprises a third content type and the operations further comprise:
based on the third content type, performing machine analysis associated with the third content type; and
based on the machine analysis associated with the third content type, determining a third display time for the third content type of the media item,
wherein deriving the total display time for the media item comprises aggregating the first display time, the second display time, and the third display time.

16. The system of claim 14, wherein the operations further comprise:
determining a total view time for the media by deriving a total display time for each media item of the plurality of media items and aggregating each total display time including the total display time of the media item.

17. The system of claim 14, wherein causing the machine action based on the total display time for the media item comprises causing a display component to display the media item for the total display time.

18. The system of claim 14, wherein causing the machine action based on the total display time for the media item comprises causing a display component to display the media item and an indication of the total display time relative to the media item.

19. A computer-storage medium comprising instructions which, when executed by one or more hardware processors of a machine, cause the machine to perform operations comprising:

training one or more machine learning models to determine weights applicable to different content types;

accessing media comprising a plurality of media items, a media item of the plurality of media items comprising a first content type;

based on the first content type, performing machine analysis associated with the first content type;

applying a weight determined by the one or more machine learning models to a result of the machine analysis to determine a first display time for the first content type of the media item;

determining a second display time for a second content type that is video, the determining the second display time comprising:

for each frame of the video, identifying a motion and activity filter value;

based on the motion and activity filter value for each frame, determining an average motion and activity filter value for the video; and deriving the second display time by applying a duration of the video to the average motion and activity filter value;

deriving a total display time for the media item based on the first display time and the second display time;

causing a machine action based on the total display time for the media item;

receiving feedback based on the machine action; and retraining at least one of the one or more machine learning models using the feedback.

* * * * *